US008025864B2

(12) United States Patent
Corma et al.

(10) Patent No.: US 8,025,864 B2
(45) Date of Patent: Sep. 27, 2011

(54) ITQ-34, NEW CRYSTALLINE MICROPOROUS MATERIAL

(75) Inventors: Avelino Corma, Valencia (ES); Maria Jose Diaz, Valencia (ES); Fernando Rey, Valencia (ES); Jose Luis Jorda Moret, Valencia (ES)

(73) Assignee: ExxonMobil Research and Engineering Company, Annandale, NJ (US)

( * ) Notice: Subject to any disclaimer, the term of this patent is extended or adjusted under 35 U.S.C. 154(b) by 616 days.

(21) Appl. No.: 11/999,140

(22) Filed: Dec. 4, 2007

(65) Prior Publication Data

US 2009/0048473 A1    Feb. 19, 2009

(51) Int. Cl.
*C01B 39/46* (2006.01)

(52) U.S. Cl. ............ 423/718; 423/702; 502/60; 502/61; 502/74; 585/820; 208/111.01; 208/111.05; 208/111.3; 208/111.35; 208/120.1; 208/112

(58) Field of Classification Search .................. 423/702, 423/718; 502/60, 61, 74; 585/820; 208/120.1, 208/111.01, 111.05, 111.3, 111.35, 112.2
See application file for complete search history.

(56) References Cited

U.S. PATENT DOCUMENTS

| | | | |
|---|---|---|---|
| 3,354,078 | A | 11/1967 | Miale et al. |
| 4,310,440 | A | 1/1982 | Wilson et al. |
| 4,440,871 | A | 4/1984 | Lok et al. |
| 6,471,941 | B1 | 10/2002 | Boix et al. |

FOREIGN PATENT DOCUMENTS

| | | |
|---|---|---|
| WO | WO 2005/040041 A1 | 5/2005 |
| WO | WO 2005/108526 A2 | 11/2005 |
| WO | WO 2006/055305 A2 | 5/2006 |
| WO | WO 2007/075382 A1 | 7/2007 |

OTHER PUBLICATIONS

Edith M. Flanigen, et al., "Aluminophosphate Molecular Sieves and the Periodic Table", Proc. 7th Int'l. Zeolite Conference, 1986, p. 103.
Christian Serre, et al., "Hydrothermal synthesis, structure determination from powder data of a three-dimensional zirconium diphosphonate with an exceptionally high termal stability: Zr(O3P-(CH2)-PO3) or MIL-57", Journal of Materials Chemistry, 12 2002, p. 2367.
Xiao-Chun Huang, et al., "Ligand-Directed Strategy for Zeolite-Type Metal-Organic Frameworks: Zinc(II) Imidazolates with Unusual Zeolitic Topologies", Angew. Chem. Int. Ed, 45, 2006, pp. 1557-1559.
M. R. Anderson, et al., "The Crystal Structure of Lithium Hydrazinium Fluoroberyllate", Acta Cryst. B29, 1973, p. 2626.
W. M. Meier, et al., "The Topology of Three-Dimensional 4-Connected Nets: Classification of Zeolite Framework Types Using Coordination Sequences", Journal of Solid State Chemistry 27, 1979, pp. 349.

(Continued)

*Primary Examiner* — David M Brunsman

(57) ABSTRACT

ITQ-34 (INSTITUTO DE TECNOLOGÍA QUÍMICA number 34) is a new crystalline microporous material with a framework of tetrahedral atoms connected by atoms capable of bridging the tetrahedral atoms, the tetrahedral atom framework being defined by the interconnections between the tetrahedrally coordinated atoms in its framework. ITQ-34 can be prepared in silicate compositions with an organic structure directing agent. It has a unique X-ray diffraction pattern, which identifies it as a new material. ITQ-34 is stable to calcination in air, absorbs hydrocarbons, and is catalytically active for hydrocarbon conversion.

18 Claims, 5 Drawing Sheets

X-ray diffraction pattern of as-synthesized ITQ-34 prepared with ethane-1,2-bis (trimethylphosphonium) hydroxide. Pattern measured with reflection geometry using Cu Kα radiation.

OTHER PUBLICATIONS

German Sastre, et al., "ZeoTsites: a code for topological and crystallographic tetrahedral sites analysis in zeolites and zeotypes", Microporous and Mesoporous Materials 43, 2001, p. 27.

Alain Tuel, et al., "NMR Characterization and Rietveld Refinement of the Structure of Rehydrated AIPO4-34", J Phys. Chem. B 2000, 104, pp. 5697.

H. Koller, "Five-Coordinate Silicon in High-Silica Zeolites", J. Am. Chem. Soc. 1999, 121, p. 3368.

"Superactive Crystalline Aluminosilicate Hydrocarbon Catalysts", Journal of Catalysis 4, 1965, p. 527.

J. N. Miale, et al., "Catalysis by Crystalline Aluminosilicates - IV. Attainable Catalytic Cracking Rate Constants, and Superactivity", Journal of Catalysis 6, 1966, p. 278.

D. H. Olson, "Chemical and Physical Properties of the ZSM-5 Substitutional Series", Journal of Catalysis 61, 1980, p. 395.

Nanfeng Zheng, et al., "Microporous and Photoluminescent Chalcogenide Zeolite Analogs", Science, vol. 298, 2002, p. 2366.

The ethane 1,2-bis-(trimethylphosphonium) hydroxide (Me$_3$P(CH$_2$)2PMe$_3$(OH)$_2$) (upper) and propane 1,3-bis-(trimethylphosphonium) hydroxide (Me$_3$P(CH$_2$)$_3$PMe$_3$(OH)$_2$ (lower) structure directing agents Framework structure of ITQ-34 showing only the tetrahedral atoms. There is a single unit cell, whose edges are defined by the box.

X-ray diffraction pattern of as-synthesized ITQ-34 prepared with ethane-1,2-bis (trimethylphosphonium) hydroxide. Pattern measured with reflection geometry using Cu Kα radiation.

X-ray diffraction pattern of as-synthesized ITQ-34 prepared with propane-1,3-bis (trimethylphosphonium) hydroxide. Pattern measured with reflection geometry using Cu Kα radiation.

X-ray diffraction pattern of calcined ITQ-34. Pattern measured with reflection geometry using Cu Kα radiation.

ITQ-34, NEW CRYSTALLINE MICROPOROUS MATERIAL

The present invention relates to a new crystalline microporous material.

BACKGROUND OF THE INVENTION

Microporous materials, including zeolites and silicoaluminophosphates, are widely used in the petroleum industry as absorbents, catalysts and catalyst supports. Their crystalline structures consist of three-dimensional frameworks containing uniform pore openings, channels and internal cages of dimensions (<20 Å) similar to most hydrocarbons. The microporous structures of these materials allow them to absorb molecules whose size is equal to or less than the size of the pore openings. The composition of the frameworks can be such that they are anionic, which requires the presence of non-framework cations to balance the negative charge. These non-framework cations, such as alkali or alkaline earth metal cations, are exchangeable, either entirely or partially with another type of cation utilizing ion exchange techniques in a conventional manner. If these non-framework cations are converted to the proton form by, for example, acid treatments or exchange with ammonium cations followed by calcination to remove the ammonia, it imparts the material with acid sites having catalytic activity. The combination of acidity and restricted pore openings gives these materials catalytic properties unavailable with other materials due to their ability to exclude or restrict some of the products, reactants, and/or transition states in many reactions. Non-reactive materials, such as pure silica and aluminophosphate frameworks are also useful and can be used in absorption and separation processes of liquids, gases, and reactive molecules such as alkenes.

The family of crystalline microporous compositions known as zeolites exists as mineral and synthetic species. Their microporous frameworks contain tetravalent silicon tetrahedra atoms connected by bridging oxygen atoms. It is possible that some or all of the silicon atoms can be substituted with other tetravalent atoms capable of tetrahedral coordination, such as germanium, titanium, or zirconium. Some of the tetrahedral atoms can also be replaced with trivalent metal atoms such as aluminum, gallium, and/or iron to form an anionic framework as described above. U.S. Pat. No. 6,471,941 discloses one such microporous zeolite composition designated ITQ-13, which has a three-dimensional framework of channels containing 9, 10, and 10 tetrahedral atoms in the pore openings along the three crystallographic directions.

Another family of crystalline microporous compositions known as molecular sieves, which exhibit the ion-exchange and/or adsorption characteristics of zeolites is the aluminophosphates, identified by the acronym AlPO, and substituted aluminophosphates as disclosed in U.S. Pat. Nos. 4,310,440 and 4,440,871. U.S. Pat. No. 4,440,871 discloses a class of silica aluminophosphates, which are identified by the acronym SAPO and which have different structures as identified by their X-ray diffraction pattern. The structures are identified by a numerical number after AlPO, SAPO, MeAPO (Me=metal), etc. (Flanigen et al., *Proc. 7 th Int. Zeolite Conf.*, p. 103 (1986) and may include Al and P substitutions by B, Si, Be, Mg, Ge, Zn, Fe, Co, Ni, etc.

ExxonMobil and others extensively use various microporous materials, such as faujasite, mordenite, and ZSM-5 in many commercial applications. Such applications include reforming, cracking, hydrocracking, alkylation, oligomerization, dewaxing and isomerization. Any new material has the potential to improve the catalytic performance over those catalysts presently employed.

There are currently over 160 known microporous framework structures as tabulated by the International Zeolite Association. There exists the need for new structures, having different properties than those of known materials, for improving the performance of many hydrocarbon processes. Each structure has unique pore, channel and cage dimensions, which gives its particular properties as described above. ITQ-34 is a a new molecular sieve having a unique framework structure.

SUMMARY OF THE INVENTION

ITQ-34 (INSTITUTO DE TECNOLOGÍA QUÍMICA number 34) is a new crystalline microporous material having a framework of tetrahedral atoms connected by bridging atoms, the tetrahedral atom framework being defined by the interconnections between the tetrahedrally coordinated atoms in its framework. ITQ-34 is stable to calcination in air, absorbs hydrocarbons, and is catalytically active for hydrocarbon conversion.

In one embodiment, the present invention is directed to a new crystalline material that is a silicate compound having a composition

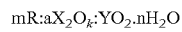

where R is an organic compound, X is any metal capable of tetrahedral coordination such as one or more of B, Ga, Al, Fe, Li, Be, P, Zn, Cr, Mg, Co, Ni, Mn, As, In, Sn, Sb, and Zr, more preferably one or more trivalent metals capable of tetrahedral coordination, and even more preferably one or more of the elements B, Ga, Al, and Fe, k is the oxidation state of X and represents a number from 1 to 3, and Y is Si alone or in combination with any other tetravalent metal capable of tetrahedral coordination such as Ge and Ti and where m represents a number greater than or equal to 0.01 and less than or equal to 1, a represents a number less than or equal to 0.2 and n represents a number less than or equal to 10 and having a unique diffraction pattern as given in Table 2.

In a more specific embodiment, the present invention is directed to a calcined crystalline silicate compound that has a composition

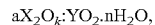

where X, Y, a, k and n have the same meaning as above and having a unique diffraction pattern as given in Table 3.

The present invention also includes a method of synthesizing a crystalline silicate compound having the diffraction pattern similar to Table 2, by mixing together a source of tetravalent element Y, where Y is Si alone or in combination with Ge and/or Ti, an organic structure directing agent (SDA) R, water, and optionally a source of metal X and optionally a source of fluoride, and heating at a temperature and for a period of time sufficient to crystallize the silicate.

The invention includes the use of ITQ-34 to separate hydrocarbons from a hydrocarbon containing stream.

The invention also includes the use of ITQ-34 as a hydrocarbon conversion catalyst for converting an organic feedstock to conversion products.

DETAILED DESCRIPTION OF THE PREFERRED EMBODIMENTS

Figure 1:
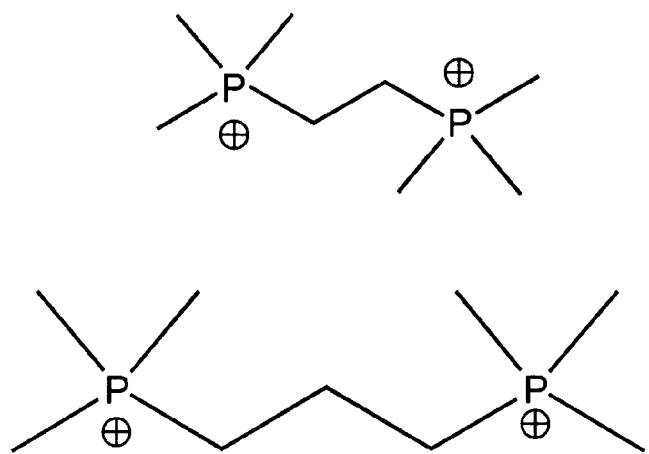
FIG. 1 is a representation of ethane-1,2-bis-(trimethylphosphonium) hydroxide ($Me_3P(CH_2)_2PMe_3(OH)_2$) and propane 1,3-bis-(trimethylphos-phonium)hydroxide (Me₃P(CH₂)₃PMe₃(OH))₂ used as organic structure directing agents (SDA) in the examples.

The present invention is a new structure of crystalline material. As with any porous crystalline material, the structure of ITQ-34 can be defined by the interconnections between the tetrahedrally coordinated atoms in its framework. In particular, ITQ-34 has a framework of tetrahedral (T) atoms connected by bridging atoms, wherein the tetrahedral atom framework is defined by connecting the nearest tetrahedral (T) atoms in the manner given in Table 1.

TABLE 1

| ITQ-34 tetrahedral atom interconnections | |
|---|---|
| T atom | Connected to: |
| T1 | T3, T8, T69, T71 |
| T2 | T9, T68, T70, T72 |
| T3 | T1, T44, T54, T67 |
| T4 | T46, T51, T55, T66 |
| T5 | T45, T50, T56, T67 |
| T6 | T24, T34, T66, T93 |
| T7 | T25, T33, T67, T94 |
| T8 | T1, T18, T26, T52 |
| T9 | T2, T17, T27, T53 |
| T10 | T12, T17, T60, T62 |
| T11 | T18, T59, T61, T63 |
| T12 | T10, T39, T49, T58 |
| T13 | T41, T50, T56, T57 |
| T14 | T40, T51, T55, T58 |
| T15 | T25, T33, T57, T98 |
| T16 | T24, T34, T58, T99 |
| T17 | T9, T10, T35, T47 |
| T18 | T8, T11, T36, T48 |
| T19 | T21, T26, T87, T89 |
| T20 | T27, T86, T88, T90 |
| T21 | T19, T44, T54, T85 |
| T22 | T41, T45, T56, T84 |
| T23 | T40, T46, T55, T85 |
| T24 | T6, T16, T84, T103 |
| T25 | T7, T15, T85, T104 |
| T26 | T8, T19, T36, T42 |
| T27 | T9, T20, T35, T43 |
| T28 | T30, T35, T78, T80 |
| T29 | T36, T77, T79, T81 |
| T30 | T28, T39, T49, T76 |
| T31 | T40, T46, T51, T75 |
| T32 | T41, T45, T50, T76 |
| T33 | T7, T15, T75, T108 |
| T34 | T6, T16, T76, T109 |
| T35 | T17, T27, T28, T37 |
| T36 | T18, T26, T29, T38 |
| T37 | T35, T39, T62, T101 |
| T38 | T36, T63, T100, T102 |
| T39 | T12, T30, T37, T99 |
| T40 | T14, T23, T31, T98 |
| T41 | T13, T22, T32, T99 |
| T42 | T26, T44, T71, T96 |

TABLE 1-continued

| ITQ-34 tetrahedral atom interconnections | |
|---|---|
| T atom | Connected to: |
| T43 | T27, T72, T95, T97 |
| T44 | T3, T21, T42, T94 |
| T45 | T5, T22, T32, T93 |
| T46 | T4, T23, T31, T94 |
| T47 | T17, T49, T80, T111 |
| T48 | T18, T81, T110, T112 |
| T49 | T12, T30, T47, T109 |
| T50 | T5, T13, T32, T108 |
| T51 | T4, T14, T31, T109 |
| T52 | T8, T54, T89, T106 |
| T53 | T9, T90, T105, T107 |
| T54 | T3, T21, T52, T104 |
| T55 | T4, T14, T23, T103 |
| T56 | T5, T13, T22, T104 |
| T57 | T13, T15, T59, T64 |
| T58 | T12, T14, T16, T65 |
| T59 | T11, T57, T100, T110 |
| T60 | T10, T102, T107, T111 |
| T61 | T11, T101, T106, T112 |
| T62 | T10, T37, T80, T90 |
| T63 | T11, T38, T81, T89 |
| T64 | T57, T74, T82, T108 |
| T65 | T58, T73, T83, T109 |
| T66 | T4, T6, T68, T73 |
| T67 | T3, T5, T7, T74 |
| T68 | T2, T66, T95, T105 |
| T69 | T1, T97, T106, T112 |
| T70 | T2, T96, T107, T111 |
| T71 | T1, T42, T81, T89 |
| T72 | T2, T43, T80, T90 |
| T73 | T65, T66, T91, T103 |
| T74 | T64, T67, T92, T104 |
| T75 | T31, T33, T77, T82 |
| T76 | T30, T32, T34, T83 |
| T77 | T29, T75, T100, T110 |
| T78 | T28, T97, T101, T112 |
| T79 | T29, T96, T102, T111 |
| T80 | T28, T47, T62, T72 |
| T81 | T29, T48, T63, T71 |
| T82 | T64, T75, T92, T98 |
| T83 | T65, T76, T91, T99 |
| T84 | T22, T24, T86, T91 |
| T85 | T21, T23, T25, T92 |
| T86 | T20, T84, T95, T105 |
| T87 | T19, T96, T102, T107 |
| T88 | T20, T97, T101, T106 |
| T89 | T19, T52, T63, T71 |
| T90 | T20, T53, T62, T72 |
| T91 | T73, T83, T84, T93 |
| T92 | T74, T82, T85, T94 |
| T93 | T6, T45, T91, T95 |
| T94 | T7, T44, T46, T92 |
| T95 | T43, T68, T86, T93 |
| T96 | T42, T70, T79, T87 |
| T97 | T43, T69, T78, T88 |
| T98 | T15, T40, T82, T100 |
| T99 | T16, T39, T41, T83 |
| T100 | T38, T59, T77, T98 |
| T101 | T37, T61, T78, T88 |
| T102 | T38, T60, T79, T87 |
| T103 | T24, T55, T73, T105 |
| T104 | T25, T54, T56, T74 |
| T105 | T53, T68, T86, T103 |
| T106 | T52, T61, T69, T88 |
| T107 | T53, T60, T70, T87 |
| T108 | T33, T50, T64, T110 |
| T109 | T34, T49, T51, T65 |
| T110 | T48, T59, T77, T108 |
| T111 | T47, T60, T70, T79 |
| T112 | T48, T61, T69, T78 |

Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony.

In one embodiment, this new crystalline silicate compound has a composition $$mR:aX_2O_k:YO_2.nH_2O,$$

where R is an organic compound, and X is any metal capable of tetrahedral coordination such as one or more of B, Al, Ga, Fe, Li, Be, P, Zn, Cr, Mg, Co, Ni, Mn, As, In, Sn, Sb, and Zr, more preferably one or more trivalent metals capable of tetrahedral coordination, and even more preferably one or more of the elements B, Ga, Al, and Fe, k is the oxidation state of X and k represents a number from 1 to 3, and Y is Si alone or in combination with any other tetravalent metal capable of tetrahedral coordination such as Ge and Ti and where m represents a number greater than or equal to 0.01 and less than or equal to 1, a represents a number less than or equal to 0.2 and n represents less than or equal to 10. This compound has the unique diffraction pattern given in Table 2 and shown in FIG. 3. The diffraction pattern in Table 2 was measured with Cu Kα radiation using a PANalytical X'Pert diffactometer with a X'celerator detector, Bragg-Brentano geometry, 45 kV and 40 mA tube voltage and current, 1/16° fixed divergence slit, 0.017° step size, and 1400 sec counting time per step.

TABLE 2

X-ray diffraction lines for as-synthesized ITQ-34

| d-spacing (Å) | relative intensity |
|---|---|
| 11.2-10.9 | 20-70 |
| 10.3-10.0 | 20-70 |
| 9.53-9.33 | 5-50 |
| 7.97-7.83 | 60-100 |
| 6.06-5.98 | 5-50 |
| 5.57-5.51 | 20-70 |
| 5.38-5.32 | 5-50 |
| 4.73-4.69 | 5-50 |
| 4.18-4.14 | 30-80 |
| 4.09-4.05 | 5-50 |
| 3.90-3.86 | 30-80 |
| 3.78-3.74 | 20-70 |
| 3.71-3.67 | 30-80 |
| 3.37-3.35 | 5-50 |
| 2.90-2.88 | 5-50 |
| 2.54-2.52 | 5-50 |
| 2.32-2.30 | 5-50 |

Figure 5:
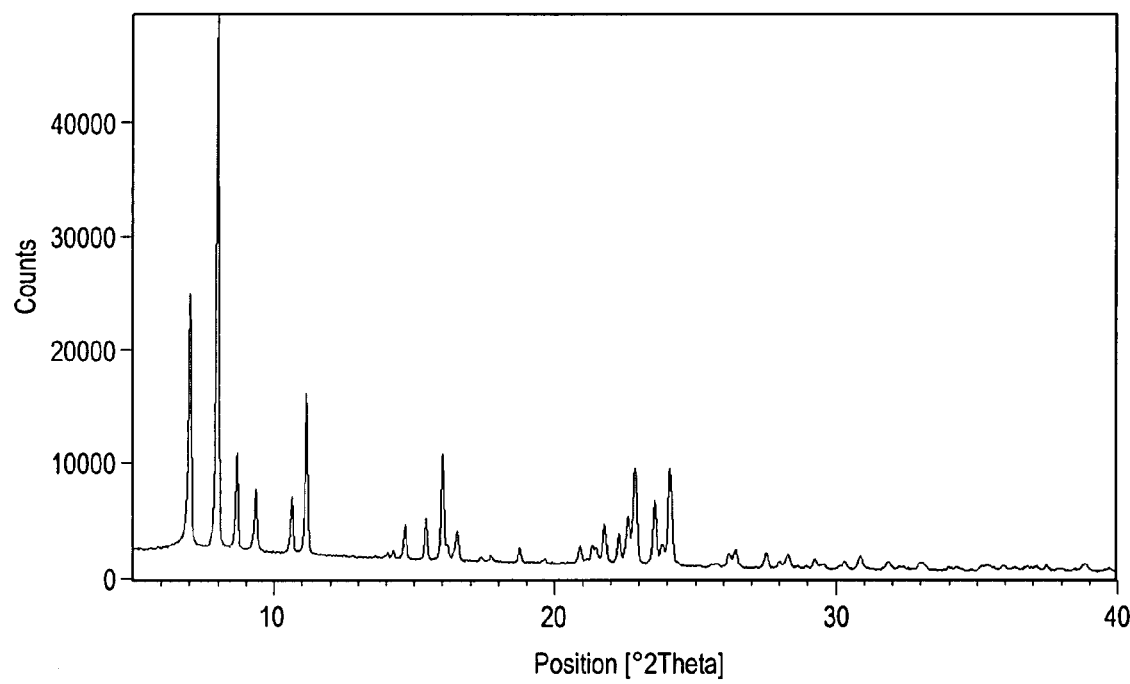
FIG. 5 shows the X-ray diffraction pattern of calcined ITQ-34.

Other embodiments of the new structure include a calcined compound of composition $$aX_2O_k:YO_2.nH_2O,$$

where X, Y, a, k and n have the same meaning as above. This compound has the unique diffraction pattern given in Table 3 and shown in FIG. 5.

TABLE 3

X-ray diffraction lines for calcined/dehydrated ITQ-34

| d-spacing (Å) | relative intensity |
|---|---|
| 12.8-12.5 | 30-80 |
| 11.2-11.0 | 60-100 |
| 10.3-10.1 | 5-50 |
| 9.57-9.37 | 5-40 |
| 8.41-8.25 | 5-40 |

TABLE 3-continued

X-ray diffraction lines for calcined/dehydrated ITQ-34

| d-spacing (Å) | relative intensity |
|---|---|
| 8.01-7.87 | 20-70 |
| 5.79-5.71 | 5-40 |
| 5.57-5.51 | 5-50 |
| 4.10-4.06 | 5-40 |
| 3.91-3.87 | 5-50 |
| 3.80-3.76 | 5-40 |
| 3.71-3.67 | 5-50 |

This new compound is made by the method of mixing together a source of tetravalent element Y, where Y is Si alone or in combination with Ge and/or Ti, an organic structure directing agent (SDA), water, and optionally a source of metal X and, optionally, a source of fluoride and heating at a temperature and for a period of time sufficient to crystallize the silicate. The method is described below.

The synthetic porous crystalline material of this invention, ITQ-34, is a crystalline phase which has a unique 3-dimensional channel system comprising intersecting 10, 10 and 9-member rings of tetrahedrally coordinated atoms. The interconnectivity of T atoms, as provided in Table 1, results in a new zeolite structure, different from other known 10, 10, 9-member rings structures, such as ITQ-13. The straight 10-member ring channels have cross-sectional dimensions between the bridging oxygen atoms of about 4.6 Ångströms by about 5.8 Ångströms and the sinusoidal 10-member ring channels have cross-sectional dimensions between the bridging oxygen atoms of about 4.8 Ångströms by about 5.9 Ångströms. The sinusoidal 9-member ring channels have cross-sectional dimensions between the bridging oxygen atoms of about 3.9 Ångströms by about 4.8 Ångströms.

Variations in the X-ray diffraction pattern may occur between the different chemical composition forms of ITQ-34, such that the exact ITQ-34 structure can vary due its particular composition and whether or not it has been calcined and rehydrated.

In the as-synthesized form ITQ-34 has a characteristic X-ray diffraction pattern, the essential lines of which are given in Table 2 measured with Cu Kα radiation. Variations occur as a function of specific composition and its loading in the structure. For this reason the intensities and d-spacings are given as ranges.

The ITQ-34 material of the present invention may be calcined to remove the organic structure directing agent without loss of crystallinity. This is useful for activating the material for subsequent absorption of other guest molecules such as hydrocarbons. The essential lines, which uniquely define calcined/dehydrated ITQ-34 are shown in Table 3 measured with Cu Kα radiation. Variations occur as a function of specific composition, temperature and the level of hydration in the structure. For this reason the intensities and d-spacings are given as ranges.

Figure 2:
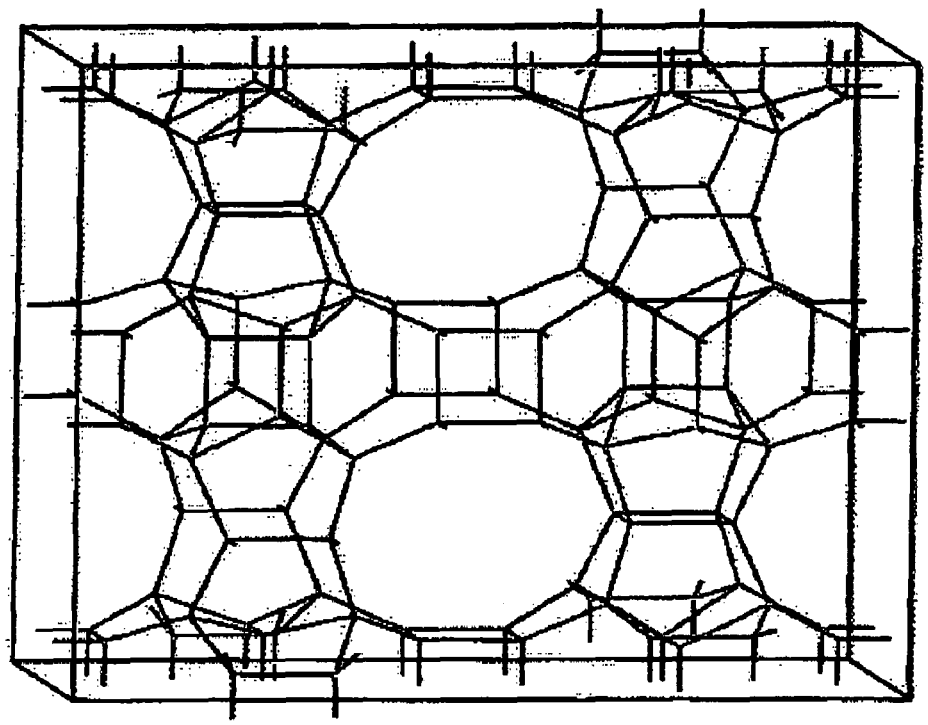
FIG. 2 shows the framework structure of ITQ-34 showing only the tetrahedral atoms. There is one unit cell, whose edges are defined by the box.

In addition, to describing the structure of ITQ-34 by the interconnections of the tetrahedral atoms as in above, it may be defined by its unit cell, which is the smallest repeating unit containing all the structural elements of the material. The pore structure of ITQ-34 is illustrated in FIG. 2 (which shows only the tetrahedral atoms) down the direction of the straight 10-membered ring channels. There is a single unit cell unit in FIG. 2, whose limits are defined by the box. Table 4 lists the typical positions of each tetrahedral atom in the unit cell in units of Ångströms. Each tetrahedral atom is bonded to bridging atoms, which are also bonded to adjacent tetrahedral atoms. Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony. Bridging atoms are those capable of connecting two tetrahedral atoms, examples which include, but not limiting, oxygen, nitrogen, fluorine, sulfur, selenium, and carbon atoms.

In the case of oxygen, it is also possible that the bridging oxygen is also connected to a hydrogen atom to form a hydroxyl group (—OH—). In the case of carbon, it is also possible that the carbon is also connected to two hydrogen atoms to form a methylene group (—$CH_2$—). For example, bridging methylene groups are present in the zirconium diphosphonate, MIL-57. See: C. Serre, G. Férey, *J. Mater. Chem.* 12, p. 2367 (2002). In the case of nitrogen, it is also possible that the nitrogen bridging atom is part of an imidazolate anion. For example, bridging imidazolate groups are present in the zinc(II) imidazolate zeolite-type compounds, $Zn(mim)_2.2H_2O$, $Zn(eim)_2.H_2O$, and $Zn(eim/mim)_2.1.25H_2O$. See: X-C. Huang, Y-Y. Lin, J-P. Zhang, X-M. Chen, *Angew. Chem. Int. Ed.* 45, p. 1557-1559 (2006). Bridging sulfur and selenium atoms have been seen in the UCR-20-23 family of microporous materials. See: N. Zheng, X. Bu, B. Wang, P. Feng, *Science* 298, p. 2366 (2002). Bridging fluorine atoms have been seen in lithium hydrazinium fluoroberyllate, which has the ABW structure type. See: M. R. Anderson, I. D. Brown, S. Vilminot, *Acta Cryst.* B29, p. 2626 (1973). Since tetrahedral atoms may move about due to other crystal forces (presence of inorganic or organic species, for example), or by the choice of tetrahedral and bridging atoms, a range of ±0.5 Ångström is implied for the x and coordinate positions and a range of ±1.0 Ångström for the y and z coordinate positions.

TABLE 4

Positions of tetrahedral (T) atoms for the ITQ-34 structure. Values, in units of Ångströms, are approximate and are typical when T = silicon and the bridging atoms are oxygen.

| Atom | x(Å) | y(Å) | z(Å) |
|---|---|---|---|
| T001 | 2.460 | 2.655 | 3.814 |
| T002 | 2.877 | 2.967 | 16.438 |
| T003 | 1.516 | 5.436 | 4.751 |
| T004 | 1.592 | 9.473 | 14.173 |
| T005 | 1.603 | 9.484 | 1.527 |
| T006 | 1.554 | 9.287 | 18.894 |
| T007 | 1.592 | 9.752 | 6.298 |
| T008 | 0.000 | 0.899 | 4.769 |
| T009 | 0.000 | 2.163 | 17.332 |
| T010 | 9.029 | 19.489 | 16.410 |
| T011 | 8.612 | 19.177 | 3.842 |
| T012 | 9.972 | 16.708 | 17.347 |
| T013 | 9.896 | 12.671 | 1.577 |
| T014 | 9.886 | 12.660 | 14.123 |
| T015 | 9.934 | 12.857 | 6.298 |
| T016 | 9.896 | 12.392 | 18.894 |
| T017 | 0.000 | 21.245 | 17.365 |
| T018 | 0.000 | 19.981 | 4.736 |
| T019 | 9.029 | 2.655 | 8.782 |
| T020 | 8.612 | 2.967 | 21.350 |
| T021 | 9.972 | 5.436 | 7.845 |
| T022 | 9.896 | 9.473 | 23.615 |
| T023 | 9.886 | 9.484 | 11.069 |
| T024 | 9.934 | 9.287 | 18.894 |
| T025 | 9.896 | 9.752 | 6.298 |
| T026 | 0.000 | 0.899 | 7.827 |
| T027 | 0.000 | 2.163 | 20.456 |

TABLE 4-continued

Positions of tetrahedral (T) atoms for the ITQ-34 structure. Values, in units of Ångströms, are approximate and are typical when T = silicon and the bridging atoms are oxygen.

| Atom | x(Å) | y(Å) | z(Å) |
|---|---|---|---|
| T028 | 2.460 | 19.489 | 21.378 |
| T029 | 2.877 | 19.177 | 8.754 |
| T030 | 1.516 | 16.708 | 20.441 |
| T031 | 1.592 | 12.671 | 11.019 |
| T032 | 1.603 | 12.660 | 23.666 |
| T033 | 1.554 | 12.857 | 6.298 |
| T034 | 1.592 | 12.392 | 18.894 |
| T035 | 0.000 | 21.245 | 20.423 |
| T036 | 0.000 | 19.981 | 7.860 |
| T037 | 9.029 | 19.489 | 21.378 |
| T038 | 8.612 | 19.177 | 8.754 |
| T039 | 9.972 | 16.708 | 20.441 |
| T040 | 9.896 | 12.671 | 11.019 |
| T041 | 9.886 | 12.660 | 23.666 |
| T042 | 2.460 | 2.655 | 8.782 |
| T043 | 2.877 | 2.967 | 21.350 |
| T044 | 1.516 | 5.436 | 7.845 |
| T045 | 1.592 | 9.473 | 23.615 |
| T046 | 1.603 | 9.484 | 11.069 |
| T047 | 2.460 | 19.489 | 16.410 |
| T048 | 2.877 | 19.177 | 3.842 |
| T049 | 1.516 | 16.708 | 17.347 |
| T050 | 1.592 | 12.671 | 1.577 |
| T051 | 1.603 | 12.660 | 14.123 |
| T052 | 9.029 | 2.655 | 3.814 |
| T053 | 8.612 | 2.967 | 16.438 |
| T054 | 9.972 | 5.436 | 4.751 |
| T055 | 9.896 | 9.473 | 14.173 |
| T056 | 9.886 | 9.484 | 1.527 |
| T057 | 8.204 | 13.727 | 3.814 |
| T058 | 8.621 | 14.039 | 16.438 |
| T059 | 7.261 | 16.509 | 4.751 |
| T060 | 7.337 | 20.545 | 14.173 |
| T061 | 7.347 | 20.557 | 1.527 |
| T062 | 7.299 | 20.359 | 18.894 |
| T063 | 7.337 | 20.824 | 6.298 |
| T064 | 5.744 | 11.971 | 4.769 |
| T065 | 5.744 | 13.236 | 17.332 |
| T066 | 3.285 | 8.417 | 16.410 |
| T067 | 2.868 | 8.105 | 3.842 |
| T068 | 4.228 | 5.636 | 17.347 |
| T069 | 4.152 | 1.599 | 1.577 |
| T070 | 4.142 | 1.588 | 14.123 |
| T071 | 4.190 | 1.785 | 6.298 |
| T072 | 4.152 | 1.320 | 18.894 |
| T073 | 5.744 | 10.173 | 17.365 |
| T074 | 5.744 | 8.909 | 4.736 |
| T075 | 3.285 | 13.727 | 8.782 |
| T076 | 2.868 | 14.039 | 21.350 |
| T077 | 4.228 | 16.509 | 7.845 |
| T078 | 4.152 | 20.545 | 23.615 |
| T079 | 4.142 | 20.557 | 11.069 |
| T080 | 4.190 | 20.359 | 18.894 |
| T081 | 4.152 | 20.824 | 6.298 |
| T082 | 5.744 | 11.971 | 7.827 |
| T083 | 5.744 | 13.236 | 20.456 |
| T084 | 8.204 | 8.417 | 21.378 |
| T085 | 8.621 | 8.105 | 8.754 |
| T086 | 7.261 | 5.636 | 20.441 |
| T087 | 7.337 | 1.599 | 11.019 |
| T088 | 7.347 | 1.588 | 23.666 |
| T089 | 7.299 | 1.785 | 6.298 |
| T090 | 7.337 | 1.320 | 18.894 |
| T091 | 5.744 | 10.173 | 20.423 |
| T092 | 5.744 | 8.909 | 7.860 |
| T093 | 3.285 | 8.417 | 21.378 |
| T094 | 2.868 | 8.105 | 8.754 |
| T095 | 4.228 | 5.636 | 20.441 |
| T096 | 4.152 | 1.599 | 11.019 |
| T097 | 4.142 | 1.588 | 23.666 |
| T098 | 8.204 | 13.727 | 8.782 |
| T099 | 8.621 | 14.039 | 21.350 |
| T100 | 7.261 | 16.509 | 7.845 |
| T101 | 7.337 | 20.545 | 23.615 |

TABLE 4-continued

Positions of tetrahedral (T) atoms for the ITQ-34 structure. Values, in units of Ångströms, are approximate and are typical when T = silicon and the bridging atoms are oxygen.

| Atom | x(Å) | y(Å) | z(Å) |
|---|---|---|---|
| T102 | 7.347 | 20.557 | 11.069 |
| T103 | 8.204 | 8.417 | 16.410 |
| T104 | 8.621 | 8.105 | 3.842 |
| T105 | 7.261 | 5.636 | 17.347 |
| T106 | 7.337 | 1.599 | 1.577 |
| T107 | 7.347 | 1.588 | 14.123 |
| T108 | 3.285 | 13.727 | 3.814 |
| T109 | 2.868 | 14.039 | 16.438 |
| T110 | 4.228 | 16.509 | 4.751 |
| T111 | 4.152 | 20.545 | 14.173 |
| T112 | 4.142 | 20.557 | 1.527 |

The complete structure of ITQ-34 is built by connecting multiple unit cells as defined above in a fully-connected three-dimensional framework. The tetrahedral atoms in one unit cell are connected to certain tetrahedral atoms in all of its adjacent unit cells. While Table 1 lists the connections of all the tetrahedral atoms for a given unit cell of ITQ-34, the connections may not be to the particular atom in the same unit cell but to an adjacent unit cell. All of the connections listed in Table 1 are such that they are to the closest tetrahedral (T) atoms, regardless of whether they are in the same unit cell or in adjacent unit cells.

Although the Cartesian coordinates given in Table 4 may accurately reflect the positions of tetrahedral atoms in an idealized structure, the true structure can be more accurately described by the connectivity between the framework atoms as shown in Table 1 above.

Another way to describe this connectivity is by the use of coordination sequences as applied to microporous frameworks by W. M. Meier and H. J. Moeck, in the *Journal of Solid State Chemistry* 27, p. 349 (1979). In a microporous framework, each tetrahedral atom, $N_0$, (T-atom) is connected to $N_1=4$ neighboring T-atoms through bridging atoms (typically oxygen). These neighboring T-atoms are then connected to $N_2$ T-atoms in the next shell. The $N_2$ atoms in the second shell are connected to $N_3$ T-atoms in the third shell, and so on. Each T-atom is only counted once, such that, for example, if a T-atom is in a 4-membered ring, at the fourth shell the $N_0$ atom is not counted second time, and so on. Using this methodology, a coordination sequence can be determined for each unique T-atom of a 4-connected net of T-atoms. The following line lists the maximum number of T-atoms for each shell.

$N_0=1$ $N_1 \leq 4$ $N_2 \leq 12$ $N_3 \leq 36$ $N_k \leq 4 \cdot 3^{k-1}$

One way to determine the coordination sequence for a given structure is from the atomic coordinates of the framework atoms using the computer program zeoTsites (see G. Sastre, J. D. Gale, *Microporous and mesoporous Materials* 43, p. 27 (2001).

The coordination sequence for the ITQ-34 structure is given in Table 5. The T-atom connectivity as listed in Table 1 and is for T-atoms only. Bridging atoms, such as oxygen usually connects the T-atoms. Although most of the T-atoms are connected to other T-atoms through bridging atoms, it is recognized that in a particular crystal of a material having a framework structure, it is possible that a number of T-atoms may not connected to one another. Reasons for non-connectivity include, but are not limited by T-atoms located at the edges of the crystals and by defects sites caused by, for example, vacancies in the crystal. The framework listed in Table 1 and Table 5 is not limited in any way by its composition, unit cell dimensions or space group symmetry.

While the idealized structure contains only 4-coordinate T-atoms, it is possible under certain conditions that some of the framework atoms may be 5- or 6-coordinate. This may occur, for example, under conditions of hydration when the composition of the material contains mainly phosphorous and aluminum T-atoms. When this occurs it is found that T-atoms may be also coordinated to one or two oxygen atoms of water molecules ($—OH_2$), or of hydroxyl groups (—OH). For example, the molecular sieve $AlPO_4$-34 is known to reversibly change the coordination of some aluminum T-atoms from 4-coordinate to 5- and 6-coordinate upon hydration as described by A. Tuel et al. in *J. Phys. Chem. B* 104, p. 5697 (2000). It is also possible that some framework T-atoms can be coordinated to fluoride atoms (—F) when materials are prepared in the presence of fluorine to make materials with 5-coordinate T-atoms as described by H. Koller in *J. Am. Chem. Soc.* 121, p. 3368 (1999).

The invention also includes a method of synthesizing a crystalline silicate composition of ITQ-34 having the diffraction pattern similar to Table 2 by mixing together a source of tetravalent element Y, where Y represents Si alone or in combination with Ge and/or Ti, an organic structure directing agent (SDA) R, water, and optionally a source of metal X, and, optionally, a source of fluoride F, with a composition, in terms of mole ratios, within the following ranges:

| | |
|---|---|
| $R/YO_2$ | 0.01-1 |
| $H_2O/YO_2$ | 2-50 |
| $X/YO_2$ | 0-0.2 |
| $F/YO_2$ | 0-2 |

TABLE 5

Coordination sequence for ITQ-34 structure.

| Atom | | | | | | coordination sequence | | | | | | | |
|---|---|---|---|---|---|---|---|---|---|---|---|---|---|
| T1 | 4 | 12 | 21 | 36 | 55 | 83 | 113 | 155 | 194 | 232 | 283 | 346 | 409 |
| T2 | 4 | 12 | 22 | 37 | 57 | 84 | 114 | 153 | 192 | 235 | 290 | 350 | 405 |
| T3 | 4 | 11 | 22 | 39 | 57 | 80 | 112 | 152 | 203 | 243 | 278 | 335 | 421 |
| T4 | 4 | 9 | 19 | 36 | 59 | 88 | 119 | 148 | 187 | 240 | 300 | 349 | 385 |
| T5 | 4 | 9 | 18 | 36 | 62 | 88 | 114 | 149 | 192 | 242 | 294 | 340 | 396 |
| T6 | 4 | 11 | 22 | 32 | 51 | 85 | 116 | 141 | 183 | 239 | 296 | 349 | 392 |
| T7 | 4 | 11 | 20 | 32 | 55 | 87 | 112 | 139 | 185 | 245 | 294 | 333 | 400 |
| T8 | 4 | 11 | 20 | 34 | 57 | 81 | 115 | 153 | 192 | 232 | 285 | 353 | 413 |
| T9 | 4 | 11 | 22 | 36 | 53 | 83 | 121 | 155 | 180 | 228 | 303 | 365 | 397 | and preferably within the following ranges:

| | |
|---|---|
| $R/YO_2$ | 0.1-0.5 |
| $H_2O/YO_2$ | 5-20 |
| $X/YO_2$ | 0-0.1 |
| $F/YO_2$ | 0-0.5 | where X is any metal capable of tetrahedral coordination such as one or more of B, Ga, Al, Fe, Li, Be, P, Zn, Cr, Mg, Co, Ni, Be, Mn, As, In, Sn, Sb, Ti, and Zr, more preferably one or more trivalent metals capable of tetrahedral coordination, and even more preferably one or more of the elements B, Ga, Al, and Fe.

The organic structure directing agents (SDA) are preferably ethane-1,2-bis(trimethylphosphonium) or propane-1,3-bis(trimethylphosphonium), the structure of which is shown in FIG. 1. Sources of silica can be colloidal, fumed or precipitated silica, silica gel, sodium or potassium silicates, or organic silicon such as tetraaklylorthosilicates, e.g. tetraethylorthosilicate, etc. Sources of metal can be boric acid, germanium (IV) ethoxide, germanium oxide, germanium nitrate, aluminum nitrate, sodium aluminate, aluminum sulfate, aluminum hydroxide, aluminum chloride, iron nitrate, iron chloride, and gallium nitrate, etc. Sources of fluoride can be ammonium fluoride, hydrogen fluoride, hydrofluoric acid, and other suitable fluoride-containing compounds. The mixture is then heated at a temperature and time sufficient to crystallize the silicate material, typically in sealed autoclaves for several hours or days.

Non-limiting suitable crystallization conditions include heating at a temperature between 125° C. and 200° C. for periods of 1 to 100 days. Stirring or tumbling may be applied during crystallization.

To the extent desired and depending on the $X_2O_3/YO_2$ molar ratio of the material, any cations present in the as-synthesized ITQ-34 can be replaced in accordance with techniques well known in the art by ion exchange with other cations. Preferred replacing cations include metal ions, hydrogen ions, and hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline material of this invention can be used to catalyze a wide variety of chemical conversion processes, particularly organic compound conversion processes, including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Thus, in its active form ITQ-34 can exhibit a high acid activity, which can be measured with the alpha test. Alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 $sec^{-1}$). The Alpha Test is described in U.S. Pat. No. 3,354,078; in the *Journal of Catalysis* 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis* 61, 395 (1980).

When used as a catalyst, the crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 927° C. The thermally treated product, especially in its metal, hydrogen or ammonium forms, is particularly useful in the catalysis of certain organic, e.g., hydrocarbon, conversion reactions.

When used as a catalyst, the crystalline material can be intimately combined with a hydrogenating component such as tungsten, vanadium, molybdenum, rhenium, nickel, cobalt, chromium, manganese, or a noble metal such as, but not limited to, platinum or palladium where a hydrogenation-dehydrogenation function is to be performed. Such component can be in the composition by way of co-crystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating ITQ-34 with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 100° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the ITQ-34 in a vacuum, but a longer time is required to obtain a sufficient amount of dehydration.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

Synthesis of ethane-1,2-bis(trimethylphosphonium) hydroxide: $((Me_3P)_2(CH_2)_2(OH)_2)$ Ethane-1,2-bis(trimethylphosphonium) bromide was synthesized by adding 25.0 g of trimethylphosphine (>97 wt. %) over a mixture of 28.20 g of 1,2-dibromoethane with 100 ml of methanol. The mixture is left under stirring at 60° C. for 2 days and a white solid precipitates, that after washing with diethyl ether, corresponds to: ethane-1,2-bis(trimethylphosphonium) bromide. This white solid, previously dissolved in water, is converted to the corresponding hydroxide using an anionic exchange resin in batch overnight, yielding a solution of ethane-1,2-bis(trimethylphosphonium) hydroxide with a concentration of 1.18 mol OH/Kg that will be used as structure directing agent source. The agent is shown in FIG. 1(Upper).

EXAMPLE 2

Propane-1,3-bis(trimethylphosphonium) hydroxide: $((Me_3P)_2(CH_2)_3(OH)_2)$

Propane-1,3-bis(trimethylphosphonium) bromide was synthesized by adding 25.0 g of trimethylphosphine (>97 wt. %) over a mixture of 30.47 g of 1,3-dibromoethane with 100 ml of methanol. The mixture is left under stirring at room temperature for 24 hours and a white solid precipitates, that after washing with diethyl ether, corresponds to: propane-1, 3-bis (trimethylphosphonium) bromide. This white solid, previously dissolved in water, is converted to the corresponding hydroxide using an anionic exchange resin in batch overnight, yielding a solution of propane-1,3-bis (trimethylphosphonium) hydroxide with a concentration of 0.89 mol OH/Kg that will be used as structure directing agent source. The agent is shown in FIG. 1 (Lower).

EXAMPLE 3

Synthesis of ITQ-34

Figure 3:
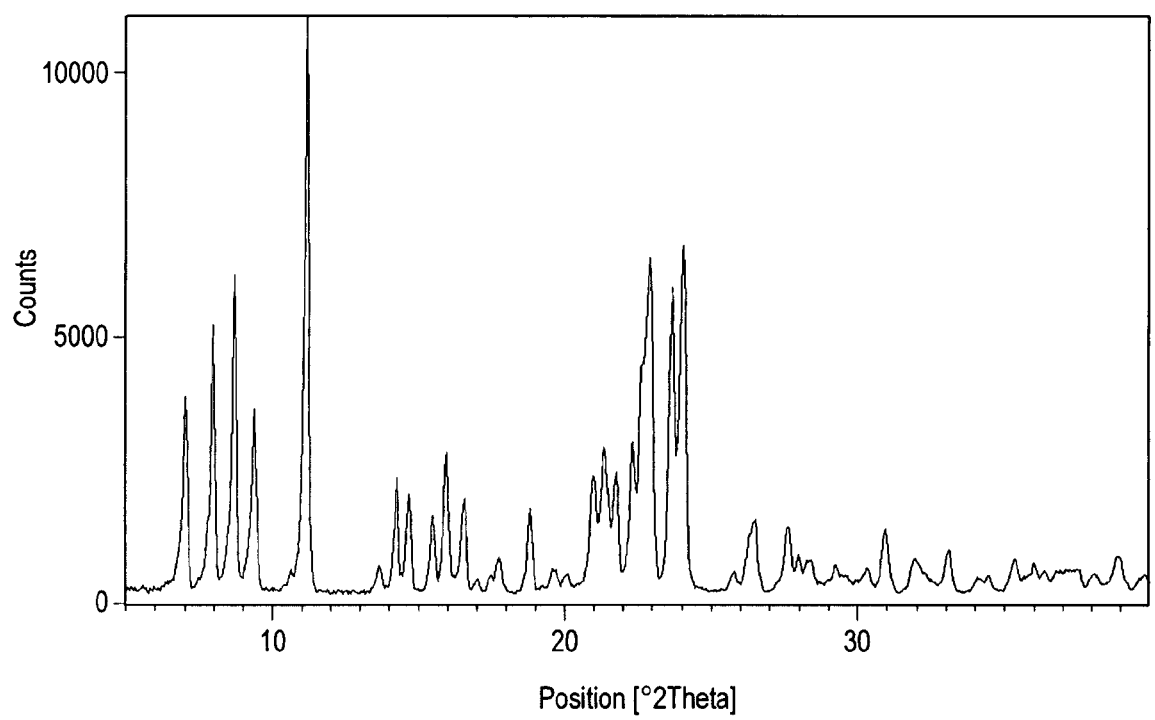
FIG. 3 shows the X-ray diffraction pattern of as-synthesized ITQ-34 prepared with ethane-1,2-bis(trimethylphosphonium) hydroxide.

0.38 g of germanium oxide were dissolved in 10.13 g of a solution of ethane-1,2-bis(trimethylphosphonium) hydroxide with a concentration of 1.18 mol OH/Kg. Then, 7.56 g of tetraethylorthosilicate (TEOS) were hydrolyzed in the solution formed and the mixture was maintained under stirring until all the ethanol formed in the hydrolysis was evaporated. Finally, 0.50 g of HF (48% wt.) were added and left stirring until the final composition was:

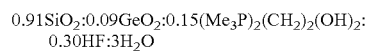
$0.91SiO_2:0.09GeO_2:0.15(Me_3P)_2(CH_2)_2(OH)_2$:
  $0.30HF:3H_2O$ where $(Me_3P)_2(CH_2)_2(OH)_2$ is ethane-1,2-bis(trimethylphosphonium) hydroxide The gel was heated in Teflon-lined stainless steel autoclaves at 175° C. under tumbling for 18 days. The solid was filtered, washed with deionized water and dried at 100° C. to yield ITQ-34 and its XRD pattern is shown in FIG. 3.

EXAMPLE 4

Synthesis of ITQ-34

The synthesis gel used for this synthesis had the following molar composition:

$0.95SiO_2:0.05GeO_2:0.15(Me_3P)_2(CH_2)_2(OH)_2$:
  $0.30HF:3H_2O$ where $(Me_3P)_2(CH_2)_2(OH)_2$ is ethane-1,2-bis(trimethylphosphonium) hydroxide The gel was prepared by dissolving 0.21 g of germanium oxide in 10.12 g of a solution of ethane-1,2-bis(trimethylphosphonium) hydroxide with a concentration of 1.18 mol OH/Kg and hydrolyzing 7.94 g of tetraethylorthosilicate (TEOS) in the solution formed under continuous mechanical stirring until all the ethanol and the appropriate amount of water were evaporated. Then, 0.50 g of HF (48% wt.) were added to yield the above gel reaction mixture.

The gel was autoclaved at 175° C. under stirring for 63 days. The solid, was recovered by filtration, washed with distilled water and dried at 100° C. The XRD pattern is similar to FIG. 3 indicates the product is ITQ-34.

EXAMPLE 5

Synthesis of ITQ-34

Figure 4:
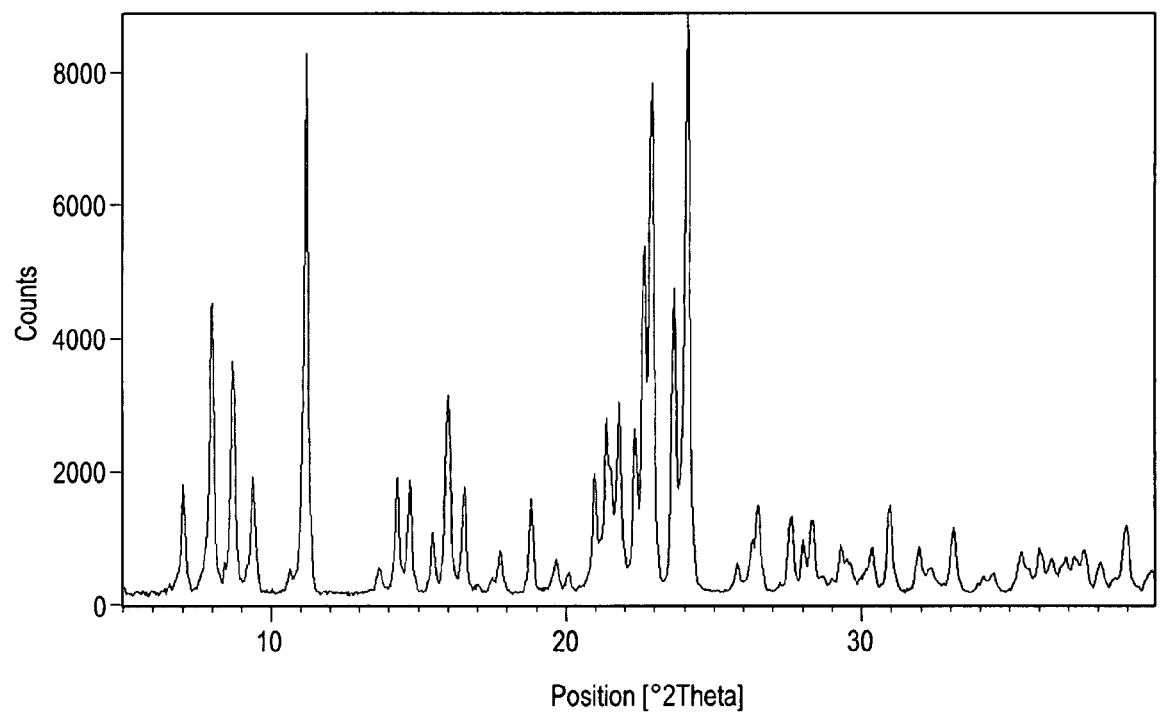
FIG. 4 shows the X-ray diffraction pattern of as-synthesized ITQ-34 prepared with propane-1,3-bis(trimethylphosphonium) hydroxide.

The ITQ-34 sample was prepared with the following gel composition:

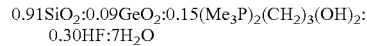
$0.91SiO_2:0.09GeO_2:0.15(Me_3P)_2(CH_2)_3(OH)_2$:
  $0.30HF:7H_2O$ where $(Me_3P)_2(CH_2)_3(OH)_2$ is propane-1,3-bis(trimethylphosphonium) hydroxide 0.39 g of germanium oxide were dissolved in 13.41 g of propane-1,3-bis(trimethylphosphonium) hydroxide with a concentration of 0.90 mol OH/Kg. Then, 7.57 g of tetraethylorthosilicate (TEOS) were hydrolyzed in the solution formed and the mixture was maintained under stirring until all the alcohol formed in the hydrolysis was evaporated and the desired composition was reached. Finally, 0.50 g of HF (48% wt.) were added. The gel was heated in Teflon-lined stainless steel autoclaves at 175° C. under stirring conditions for 6 days. The solid was filtered, washed with deionized water and dried at 100° C. The XRD pattern of the sample corresponds to that of ITQ-34 and is shown in FIG. 4.

EXAMPLE 6

Synthesis of ITQ-34

0.25 g of germanium oxide were dissolved in 16.85 g of a solution of propane-1,3-bis(trimethylphosphonium) hydroxide with a concentration of 0.89 mol OH/Kg. Then, 9.95 g of tetraethylorthosilicate (TEOS) were hydrolyzed in the solution formed and the mixture was maintained under stirring until all the ethanol was evaporated. Then, 0.625 g of HF (48% wt.) were added and left stirring until the final composition was:

$$0.95SiO_2:0.05GeO_2:0.15(Me_3P)_2(CH_2)_3(OH)_2: 0.30HF:7H_2O$$

where $(Me_3P)_2(CH_2)_3(OH)_2$ is propane-1,3-bis(trimethylphosphonium) hydroxide The gel was autoclaved at 175° C. under tumbling for 8 days. The solid was filtered, washed with deionized water and dried at 100° C. The XRD pattern is similar to FIG. 4 indicates the product is ITQ-34.

EXAMPLE 7

Synthesis of ITQ-34

12.75 g of tetraethylorthosilicate (TEOS) were hydrolyzed in 33.73 g of a solution of propane-1,3-bis(trimethylphosphonium) hydroxide with a concentration of 0.89 mol OH/Kg and the mixture was maintained under stirring until all the ethanol formed in the hydrolysis was evaporated. Then, 1.275 g of HF (48% wt.) were added and left stirring to reach the final composition:

$$SiO_2:0.25(Me_3P)_2(CH_2)_3(OH)_2:0.50HF:3H_2O$$

where $(Me_3P)_2(CH_2)_3(OH)_2$ is propane-1,3-bis(trimethylphosphonium) hydroxide The gel was heated in Teflon-lined stainless steel autoclaves at 175° C. under tumbling for 18 days. The solid filtered, washed with deionized water and dried at 100° C. yield ITQ-34 impurified with ITQ-19.

EXAMPLE 8

Synthesis of ITQ-34

The synthesis gel used for this synthesis had the following molar composition:

$$SiO_2:0.25(Me_3P)_2(CH_2)_3(OH)_2:0.50HF:5H_2O$$

where $(Me_3P)_2(CH_2)_3(OH)_2$ is propane-1,3-bis(trimethylphosphonium) hydroxide.

The gel was prepared by hydrolyzing 14.57 g of tetraethylorthosilicate (TEOS) in 32.39 g of a solution of propane-1,3-bis(trimethylphosphonium) hydroxide with a concentration of 1.08 mol OH/Kg and maintaining under continuous mechanical stirring until all the ethanol and the appropriate amount of water were evaporated to yield the above gel reaction mixture. Finally, 1.46 g of HF (48% wt.) were added and the mixture homogenized.

The gel was autoclaved at 200° C. under stirring for 7 days. The solid, ITQ-34 with a small impurity, was recovered by filtration, washed with distilled water and dried at 100° C.

What is claimed is:

1. A synthetic crystalline material having a framework of tetrahedral atoms (T) connected by bridging atoms, the tetrahedral atom framework being defined by connecting the nearest tetrahedral (T) atoms in the manner shown in Table 1 of the specification.

2. The crystalline material of claim 1 wherein said tetrahedral atoms include one or more elements selected from the group consisting of B, Li, Be, Al, P, Si, Ga, Ge, Zn, Cr, Mg, Fe, Co, Ni, Mn, As, In, Sn, Sb, Ti, and Zr.

3. The crystalline material of claim 1 wherein said bridging atoms include one or more elements selected from the group consisting of O, N, F, S, Se, and C.

4. A process for the separation of hydrocarbons from a hydrocarbon-containing stream comprising contacting said hydrocarbon stream with the material of claim 1.

5. A process for converting a feedstock comprising organic compounds to at least one conversion product which comprises contacting said feedstock at organic compound conversion conditions with a catalyst comprising an active form of the material of claim 1.

6. A synthetic porous crystalline material, as synthesized, characterized by an X-ray diffraction pattern including the peaks as set forth below:

| d-spacing (Å) | relative intensity |
| --- | --- |
| 11.2-10.9 | 20-70 |
| 10.3-10.0 | 20-70 |
| 9.53-9.33 | 5-50 |
| 7.97-7.83 | 60-100 |
| 6.06-5.98 | 5-50 |
| 5.57-5.51 | 20-70 |
| 5.38-5.32 | 5-50 |
| 4.73-4.69 | 5-50 |
| 4.18-4.14 | 30-80 |
| 4.09-4.05 | 5-50 |
| 3.90-3.86 | 30-80 |
| 3.78-3.74 | 20-70 |
| 3.71-3.67 | 30-80 |
| 3.37-3.35 | 5-50 |
| 2.90-2.88 | 5-50 |
| 2.54-2.52 | 5-50 |
| 2.32-2.30 | 5-50. |

7. The crystalline material of claim 6 wherein said crystalline material has a composition $mR:aX_2O_3:YO_2.nH_2O$ where R is an organic compound, X is one or more metals selected from the group consisting of B, Ga, Al and Fe, and Y is one or more metals selected from the group consisting of Si, Ge and Ti, and m is a number greater than or equal to 0.01 and less than or equal to 1, a is a number less than or equal to 0.2 and n is a number less than or equal to 10.

8. A calcined dehydrated material characterized by an X-ray diffraction pattern including the most significant lines as set forth below

| d-spacing (Å) | relative intensity |
| --- | --- |
| 12.8-12.5 | 30-80 |
| 11.2-11.0 | 60-100 |
| 10.3-10.1 | 5-50 |
| 9.57-9.37 | 5-40 |
| 8.41-8.25 | 5-40 |
| 8.01-7.87 | 20-70 |
| 5.79-5.71 | 5-40 |
| 5.57-5.51 | 5-50 |
| 4.10-4.06 | 5-40 |
| 3.91-3.87 | 5-50 |
| 3.80-3.76 | 5-40 |
| 3.71-3.67 | 5-50. |

9. A process for the separation of hydrocarbons from a hydrocarbon-containing stream comprising contacting said hydrocarbon stream with the material of claim 8.

10. A process for converting a feedstock comprising organic compounds to at least one conversion product which comprises contacting said feedstock at organic compound conversion conditions with a catalyst comprising an active form of the material of claim 8.

11. The process for converting a feedstock as in claim 10 wherein the catalyst is combined with a hydrogenating metal.

12. The process for converting a feedstock as in claim 11 wherein said hydrogenating metal is one or more metals selected from the group consisting of tungsten, vanadium, molybdenum, rhenium, nickel, cobalt, chromium, manganese, or a noble metal.

13. A method of synthesizing a crystalline silicate composition of ITQ-34 having the diffraction pattern as set forth below

| d-spacing (Å) | relative intensity |
| --- | --- |
| 11.2-10.9 | 20-70 |
| 10.3-10.0 | 20-70 |
| 9.53-9.33 | 5-50 |
| 7.97-7.83 | 60-100 |
| 6.06-5.98 | 5-50 |
| 5.57-5.51 | 20-70 |
| 5.38-5.32 | 5-50 |
| 4.73-4.69 | 5-50 |
| 4.18-4.14 | 30-80 |
| 4.09-4.05 | 5-50 |
| 3.90-3.86 | 30-80 |
| 3.78-3.74 | 20-70 |
| 3.71-3.67 | 30-80 |
| 3.37-3.35 | 5-50 |
| 2.90-2.88 | 5-50 |
| 2.54-2.52 | 5-50 |
| 2.32-2.30 | 5-50 | by mixing together a source of tetravalent element Y, where Y is Si alone or in combination with Ge and/or Ti, an organic structure directing agent R, water, and optionally a source of metal X and optionally a source of fluoride F, the mixture having a composition, in terms of mole ratios, within the following ranges:

| | |
| --- | --- |
| $R/YO_2$ | 0.01-1 |
| $H_2O/YO_2$ | 2-50 |
| $X/YO_2$ | 0-0.2 |
| $F/YO_2$ | 0-2 | and where X is any trivalent metal capable of tetrahedral coordination.

14. The method according to claim 13 wherein X is one or more metals selected from the group consisting of B, Ga, Al or Fe and Y is silicon and may include one or more metals selected from the group consisting of Ge and Ti.

15. The method of claim 13 wherein said molar ratio ranges are

| | |
| --- | --- |
| $R/YO_2$ | 0.1-0.5 |
| $H_2O/YO_2$ | 5-20 |
| $X/YO_2$ | 0-0.1 |
| $F/YO_2$ | 0-0.5. |

16. The method of claim 14 wherein said molar ratio ranges are

| | |
| --- | --- |
| $R/YO_2$ | 0.1-0.5 |
| $H_2O/YO_2$ | 5-20 |
| $X/YO_2$ | 0-0.1 |
| $F/YO_2$ | 0-0.5. |

17. The method of claim 13, wherein said organic structure directing agent (R) is ethane-1,2-bis (trimethylphosphonium) or propane-1,3-bis (trimethylphosphonium).

18. The method of claim 14 wherein said organic structure directing agent (R) is ethane-1,2-bis (trimethylphosphonium) or propane-1,3-bis (trimethylphosphonium).

* * * * *

UNITED STATES PATENT AND TRADEMARK OFFICE
CERTIFICATE OF CORRECTION

| | | |
|---|---|---|
| PATENT NO. | : 8,025,864 B2 | Page 1 of 1 |
| APPLICATION NO. | : 11/999140 | |
| DATED | : September 27, 2011 | |
| INVENTOR(S) | : Corma et al. | |

It is certified that error appears in the above-identified patent and that said Letters Patent is hereby corrected as shown below:

On the title page add the following priority claim:

Related U.S. Application Data
(60) Provisional Patent No. 60/873,380,
 filed on Dec. 7, 2006.

Signed and Sealed this
Twenty-ninth Day of November, 2011

David J. Kappos
*Director of the United States Patent and Trademark Office*